(12) United States Patent
Ma et al.

(10) Patent No.: US 12,154,211 B2
(45) Date of Patent: Nov. 26, 2024

(54) MULTI-GPU-BASED IMAGE RENDERING METHOD AND APPARATUS, AND READABLE STORAGE MEDIUM

(71) Applicants: SHENZHEN TECHNOLOGY UNIVERSITY, Guangdong (CN); OPENVERSE TECHNOLOGY INC., Shanghai (CN)

(72) Inventors: Junchao Ma, Guangdong (CN); Zixia Qiu, Guangdong (CN); Haitang Zhang, Guangdong (CN); Guanglin Huang, Guangdong (CN); Bicheng Wang, Guangdong (CN); Wei Huang, Guangdong (CN)

(73) Assignees: SHENZHEN TECHNOLOGY UNIVERSITY, Guangdong (CN); OPENVERSE TECHNOLOGY INC., Shanghai (CN)

( * ) Notice: Subject to any disclaimer, the term of this patent is extended or adjusted under 35 U.S.C. 154(b) by 0 days.

(21) Appl. No.: 18/288,738

(22) PCT Filed: Apr. 12, 2023

(86) PCT No.: PCT/CN2023/087872
§ 371 (c)(1),
(2) Date: Oct. 27, 2023

(87) PCT Pub. No.: WO2024/169030
PCT Pub. Date: Aug. 22, 2024

(65) Prior Publication Data
US 2024/0320896 A1   Sep. 26, 2024

(30) Foreign Application Priority Data
Feb. 16, 2023   (CN) .......................... 202310164283.2

(51) Int. Cl.
*G06T 15/00*   (2011.01)

(52) U.S. Cl.
CPC ................................ *G06T 15/005* (2013.01)

(58) Field of Classification Search
CPC ...... G06T 15/005; G06T 19/006; G06T 19/20
See application file for complete search history.

(56) References Cited

U.S. PATENT DOCUMENTS

| 2005/0231502 A1 | 10/2005 | Harper et al. |
| 2009/0189908 A1* | 7/2009 | Diard ....................... G09G 5/39 345/502 |

(Continued)

FOREIGN PATENT DOCUMENTS

| CN | 103646235 A | 3/2014 |
| CN | 112529995 A | 3/2021 |

(Continued)

OTHER PUBLICATIONS

Yanmei, Shen; "Research on Fast Image Fusion Algorithm Based on GPU"; Dissertation for the Master Degree in Engineering—Jun. 2017; pp. 1-65.

(Continued)

*Primary Examiner* — Michelle Chin
(74) *Attorney, Agent, or Firm* — Notaro, Michalos & Zaccaria P.C.

(57) ABSTRACT

A multi-GPU-based image rendering method includes: acquiring a target image, and detecting first rendering durations for different number of available devices to render the target image, where the available devices are GPU devices for image rendering; comparing the first rendering durations corresponding to different number of available devices, and acquiring the available devices corresponding to a minimum one of the first rendering durations as target devices; dividing the target image according to the target devices and a second rendering duration to obtain second images, where the second rendering duration is a duration required for a single target device to render the target image; rendering the (Continued)

second images based on rendering tasks in the target devices to obtain second image results, and combining the second image results to obtain a rendering image of the target image, where the rendering tasks are configured to render the second images.

6 Claims, 6 Drawing Sheets

(56) References Cited

U.S. PATENT DOCUMENTS

| | | | |
|---|---|---|---|
| 2019/0205231 A1* | 7/2019 | Zhao | G06F 11/3419 |
| 2019/0355087 A1* | 11/2019 | Consul | A63F 13/355 |
| 2020/0082493 A1 | 3/2020 | Wang et al. | |
| 2022/0101494 A1 | 3/2022 | Mardani Korani et al. | |
| 2022/0101504 A1 | 3/2022 | Cheng et al. | |
| 2022/0180588 A1 | 6/2022 | Schluessler et al. | |
| 2022/0285009 A1* | 9/2022 | Sha | G06T 7/344 |

FOREIGN PATENT DOCUMENTS

| | | |
|---|---|---|
| CN | 113269856 A | 8/2021 |
| CN | 113521735 A | 10/2021 |
| CN | 114398167 A | 4/2022 |
| CN | 114494559 A | 5/2022 |

OTHER PUBLICATIONS

Bilal, Muhammad, et al.; "Big Data with deep learning for benchmarking profitability performance in project tendering"; Expert Systems With Applications 147 (2020); 113194:1-19.

International Search Report and Written Opinion with translations for PCT Application No. PCT/CN2023/087872, mailed Jun. 23, 2023.

Chinese Search Report for Chinese Application No. CN 2023101642832 dated Feb. 16, 2023—see translation.

* cited by examiner

MULTI-GPU-BASED IMAGE RENDERING METHOD AND APPARATUS, AND READABLE STORAGE MEDIUM

CROSS-REFERENCE TO RELATED APPLICATIONS

This application is a national stage filing under 35 U.S.C. § 371 of international application number PCT/CN2023/087872, filed Apr. 12, 2023, which claims priority to Chinese patent application No. 2023101642832 filed Feb. 12, 2023. The contents of these applications are incorporated herein by reference in their entirety.

TECHNICAL FIELD

The present disclosure relates to the field of image rendering, and in particular to a multi-GPU-based image rendering method and apparatus, and a readable storage medium.

BACKGROUND

Image rendering is a very important technology at present, and the acceleration of image rendering is also a problem that needs to be solved urgently at present. The existing image rendering acceleration scheme is mainly achieved by increasing the number of GPU devices. However, when multiple GPU devices are applied to a simple model, there may be problems such as the overhead caused by communication between multiple GPUs being greater than the overhead saved by simultaneous rendering by multiple GPUs, resulting in a decrease in rendering speed.

SUMMARY

In view of the above, embodiments of the present disclosure provide a multi-GPU-based image rendering method and apparatus, and a readable storage medium, to reduce the duration of GPU image rendering.

In accordance with an aspect of the present disclosure, a multi-GPU-based image rendering method is provided, including: acquiring a target image, and detecting first rendering durations for different number of available devices to render the target image, where the available devices are GPU devices for image rendering; comparing the first rendering durations corresponding to different number of available devices, and acquiring the available devices corresponding to a minimum one of the first rendering durations as target devices; dividing the target image according to the target devices and a second rendering duration to obtain second images, where the second rendering duration is a duration required for a single target device to render the target image; and rendering the second images based on rendering tasks in the target devices to obtain second image results, and combining the second image results to obtain a rendering image of the target image, where the rendering tasks are configured to render the second images.

According to some embodiments of the present disclosure, the acquiring a target image, detecting first rendering durations for different number of available devices to render the target image, comparing the first rendering durations corresponding to different number of available devices, and acquiring the available devices corresponding to a minimum one of the first rendering durations as target devices includes: adjusting the number of the available devices, and equally dividing the target image based on the number of the available devices to obtain first images; allocating the first images to the available devices, and acquiring durations for the available devices to render the first images as first rendering durations; and comparing the first rendering durations required by different number of available devices, acquiring the number of available devices corresponding to a minimum one of the first rendering durations as a first value, and selecting the available devices with the number being the first value as the target devices.

According to some embodiments of the present disclosure, the dividing the target image according to the target devices and a second rendering duration to obtain second images includes: acquiring a duration required for a single target device to render the target image as a second rendering duration; acquiring the number of frames of the target image that is rendered by the single target device in a fixed time to obtain the second rendering duration; comparing reciprocals of second rendering durations of different target devices to obtain a division ratio; and dividing the target image based on the division ratio to obtain second images.

According to some embodiments of the present disclosure, the rendering the second images based on rendering tasks in the target devices to obtain second image results, and combining the second image results to obtain a rendering image of the target image includes: allocating rendering tasks to the target devices; executing, by the target devices, the rendering tasks in parallel to obtain second image results; and combining the second image results to obtain a rendering image of the target image.

According to some embodiments of the present disclosure, the rendering the second images based on rendering tasks in the target devices to obtain second image results, and combining the second image results to obtain a rendering image of the target image includes: allocating rendering tasks to the target devices; executing, by the target devices, the rendering tasks in parallel to obtain second image results; and combining the second image results to obtain a rendering image of the target image.

In accordance with another aspect of the present disclosure, a multi-GPU-based image rendering apparatus is provided, including: a first module configured to acquire a target image, and detect first rendering durations for different number of available devices to render the target image, where the available devices are GPU devices for image rendering; a second module configured to compare the first rendering durations corresponding to different number of available devices, and acquire the available devices corresponding to a minimum one of the first rendering durations as target devices; a third module configured to divide the target image according to the target devices and a second rendering duration to obtain second images, where the second rendering duration is a duration required for a single target device to render the target image; and a fourth module configured to render the second images based on rendering tasks in the target devices to obtain second image results, and combining the second image results to obtain a rendering image of the target image, where the rendering tasks are configured to render the second images.

In accordance with yet another aspect of the present disclosure, an electronic device is provided, including a processor and a memory. The memory is configured to store a program which, when executed by the processor, causes the processor to implement the multi-GPU-based image rendering method as described in any one of the embodiments above.

The electronic device according to the embodiment of the present disclosure has at least the same advantageous effects as the above-mentioned multi-GPU-based image rendering method.

In accordance with still another aspect of the present disclosure, a computer-readable storage medium is provided, storing a program which, when executed by a processor, causes the processor to implement the multi-GPU-based image rendering method as described in any one of the embodiments above.

The computer-readable storage medium according to the embodiment of the present disclosure has at least the same advantageous effects as the above-mentioned multi-GPU-based image rendering method.

An embodiment of the present disclosure further discloses a computer program product or computer program. The computer program product or computer program includes a computer instruction stored in a computer-readable storage medium. A processor of a computer device may read the computer instruction from the computer-readable storage medium, and the computer instruction, when executed by the processor, causes the processor to implement the above-mentioned method.

According to the embodiments of the present disclosure, the number of available GPU devices with the minimum rendering duration is acquired, the value of available devices corresponding to a minimum one of the first rendering durations is selected based on this number, these available devices are selected as target devices, and the number of GPUs is dynamically adjusted, thus avoiding the problem that the overhead caused by communication between multiple GPUs is greater than the overhead saved by simultaneous rendering of multiple GPUs because the model is too simple, resulting in a decrease in rendering speed. The target image is divided by means of a duration required for each target device to render the target image to obtain second images, the second images are rendered by means of rendering tasks in the target devices to obtain second image results, and the second image results are combined to obtain a rendering image of the target image. Thus, by dynamically adjusting a pixel segmentation ratio, high-performance GPUs can share a part of pixel data of low-performance GPUs, so that the burden of the low-performance GPUs is reduced to achieve load balancing. Meanwhile, the rendering durations of the GPUs are averaged, and the difference between rendering durations is reduced, thereby reducing the overall rendering duration of a system.

BRIEF DESCRIPTION OF DRAWINGS

In order to more clearly illustrate the technical schemes in embodiments of the present application, the accompanying drawings that need to be used in the description of the embodiments will be briefly introduced below. Apparently, the drawings in the following description are merely some embodiments of the present application. For those having ordinary skills in the art, other drawings can also be obtained according to these drawings without creative effort.

DETAILED DESCRIPTION

Figure 1:
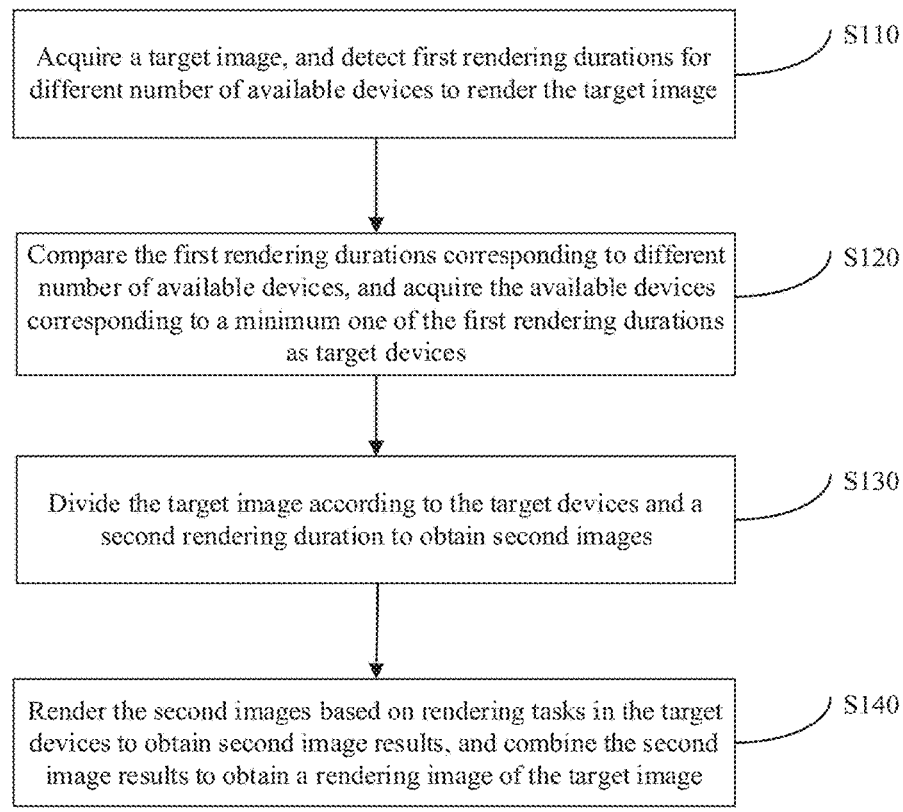
FIG. 1 is a flowchart of a multi-GPU-based image rendering method provided by an embodiment of the present disclosure.

In order to make the objects, technical schemes and advantages of the present application clearer, the present application will be further described below in detail in conjunction with the drawings and embodiments. It should be understood that the embodiments described herein are only intended to illustrate the present application, and are not intended to limit the present application.

Graphics Processing Unit (GPU), also known as display core, visual processing unit or display chip, is a microprocessor unit that specializes in image processing on personal computers, workstations, gaming consoles and some mobile devices (such as tablet computers and smartphones). At present, image rendering mainly depends on GPU. In the process of rendering 3D images by GPU, a program developer needs to prepare task instructions to be executed by GPU first and then submit the task instructions to a GPU execution engine through a queue, and when acquiring the task instructions from the queue, the GPU execution engine executes tasks to complete the image rendering process. In the existing image rendering process, all rendering tasks are submitted to one queue, and the tasks closer to the head of the queue are executed by GPU first.

For the acceleration of image rendering, the traditional hardware-accelerated image rendering method is mostly adopted, that is, the number of GPU devices are increased, and all rendering tasks are equally allocated to multiple GPUs for completion. All GPUs may adopt a serial execution scheme to complete respective rendering tasks, that is, model data is loaded, color values that all pixel points should display in the current model environment are calculated after the model data is loaded, color data is transmitted to a target object by the multiple GPUs after the color values are calculated, and a rendering result is displayed on a screen by the target object. Main multi-GPU image rendering schemes include an alternate frame rendering scheme and a scissor frame rendering scheme. The alternate frame rendering scheme is achieved by rendering images at different time by different GPUs, and then displaying the images in chronological order. The scissor frame rendering scheme is achieved by proportionally segmenting a single image, rendering a portion by each GPU, allowing different GPUs to jointly render data of the same frame, and then combining and displaying the rendering results of multiple GPUs on the screen.

However, the existing hardware acceleration technology is not suitable for a simple model because of not considering the problem that the overhead caused by communication between multiple GPUs may be greater than the overhead saved by simultaneous rendering of multiple GPUs when the model is too simple, resulting in a decrease in rendering speed. In addition, because all GPUs adopt the serial execution scheme to complete respective rendering tasks, the utilization of individual GPU resources is not saturated, resulting in a waste of GPU resources. However, if a single GPU is adopted for rendering, although the problem for the simple model is solved, for a complex model, the rendering capability of the single GPU is limited, so there are some problems such as insufficiently fast rendering speed and low frame rate of rendering high-quality images in scenarios with high real-time requirements. Therefore, in a complex rendering situation, a multi-GPU architecture is adopted to meet service needs. The traditional multi-GPU image rendering scheme cannot give full play to the processor performance to meet high real-time requirements, and cannot deal with problem of load unbalance between GPUs with different architectures under a heterogeneous GPU architecture, resulting in high latency. Therefore, the present application provides a multi-GPU-based image rendering method and apparatus, and a readable storage medium, to reduce the duration of GPU image rendering.

Referring to FIG. 1. FIG. 1 is a flowchart of a multi-GPU-based image rendering method provided by an embodiment of the present disclosure, the method includes steps S110 to S140.

At S110, a target image is acquired, and first rendering durations for different number of available devices to render the target image are detected, where the available devices are GPU devices for image rendering.

At S120, the first rendering durations corresponding to different number of available devices are compared, and the available devices corresponding to a minimum one of the first rendering durations are acquired as target devices.

In an embodiment, an object to be rendered, that is, a target image, is acquired. The total number of currently available devices is counted, that is, it is found out how many GPUs may be used to execute a rendering task in the current operating environment, then a rendering model is loaded, and the optimal number of GPUs required for this rendering task is determined according to the complexity of the model. In an embodiment, the number of available devices is adjusted, and durations taken by different number of available devices to render the target image are counted as first rendering durations. In an embodiment, the number of available devices is adjusted, the target image is equally divided according to the number to obtain first images, where the number of the first images is the same as that of the currently adjusted available devices, the first images are allocated to different available devices respectively, the first images are rendered by the available devices to obtain first image results, and the first image results are combined to obtain a rendering image of the target image. The duration required for the whole rendering process is acquired as a first rendering duration. The number of available devices is constantly adjusted within the total number of the currently available devices, the target image is rendered, first rendering durations corresponding to different number of available devices are acquired, until all different number of available devices within the total number of currently available devices have rendered the target image. The number of available devices corresponding to the minimum first rendering duration is selected as a first value, and the available devices with the number corresponding to the first value are selected as target devices. Exemplarily, one GPU is adopted for image rendering in the first round and the duration consumed in this round is counted, two GPUs are adopted for image rendering in the second round and the duration consumed in the second round is counted, the durations consumed in the two rounds are compared, if the duration consumed in the second round is shorter than that consumed in the first round, it is indicated the speed of rendering by two GPUs is faster than the speed of rendering by one GPU, and so on, the duration consumed in image rendering by three GPUs is counted, until the number of GPUs with the minimum rendering duration is found. Furthermore, three variables are created: temp, configured to store the duration required for rendering each time using the number of current GPUs: tmin, configured to store the minimum duration consumed for rendering after traversing the number of the GPUs; and i, configured to indicate the number of GPUs used in the current round, where the initial value of temp is a very large number (INF). In an $i^{th}$ round, the target image is equally divided into i parts according to pixel regions, and then the pixel regions are allocated to i GPUS respectively; each GPU that receives a pixel region completes pixel color calculation of a corresponding image; after all the i GPUs complete respective rendering tasks, each GPU summarizes i calculation results to the first GPU; the duration consumed from the step of equally dividing the target image according to pixel regions and allocating the pixel regions to all GPUs to the step of summarizing i calculation results to the first GPU is counted, and the counting result, that is, the first rendering duration, is stored in the temp; and after counting durations required for the i GPUs to render a frame of image, in the next round, duration required for i+1 GPUs to render a frame of image is counted. Compared with the traditional scheme which adopts a fixed number of GPUs to accelerate image rendering, the number of GPUs is dynamically adjusted based on the complexity of the model, which avoids the problem that the overhead caused by communication between multiple GPUs is greater than the overhead saved by simultaneous rendering of multiple GPUs because the model is too simple, resulting in a decrease in rendering speed.

At S130, the target image is divided according to the target devices and a second rendering duration to obtain second images, where the second rendering duration is a duration required for a single target device to render the target image.

In an embodiment, after acquiring the number of target devices, that is, the first value, the target image is equally divided into n parts to obtain second images, where n is the number of target devices, and the second images are allocated respectively to the target devices for rendering. Furthermore, in the actual situation, the specifications and models of multiple target devices may be inconsistent or the loads of the target devices may be different, so the loads of the target devices may be unbalanced if the target image is equally divided in this case. Therefore, the number of frames that a single target device renders the target image in a fixed time is acquired to obtain a second rendering duration. In an embodiment, the duration for rendering the image depends on the number of frames of rendering in a unit time, and a reciprocal of this index is taken as a rendering duration for rendering a single frame of target image, that is, the second rendering duration. The shorter the rendering duration, the better the performance; conversely, the longer the rendering duration, the worse the performance. It should be noted that the fixed time may be any value, the setting of time is not limited at this moment, but the unit time is often used, such as the number of frames of rendering in one second, so the duration required to acquire the division ratio can be reduced. Furthermore, a threshold of the number of times of rendering is set. When the number of times that a single target device renders the target image in the fixed time and acquires the number of frames of rendering to obtain a second rendering duration is not greater than the threshold of the number of times of rendering, rendering is repeated and the second rendering durations corresponding to different number of times are obtained, until the number of times of rendering is greater than the threshold of the number of times of rendering, and an average value of the second rendering durations corresponding to different number of times is acquired as a final second rendering duration of the target device, thus improving the accuracy. The same operation is repeated to calculate the second rendering durations corresponding to all the target devices, and comparison is performed based on the second rendering durations corresponding to the target devices to obtain a division ratio. In an embodiment, the operation of comparing the second rendering durations is more specifically interpreted as acquiring a ratio of the number of times of rendering of the target devices to the second rendering duration, taking the obtained ratio as a division ratio, and dividing the target image according to the division ratio to obtain second images, that is, comparing based on the second rendering durations is not directly comparing the second rendering durations. It should be noted that the number of second images is equal to the number of target devices, that is, the first value. Exemplarily, (1) set total=1, $\{T1, T2, \ldots, Tn\}=\{0, 0, \ldots, 0\}$: total represents the current number of times of rendering, with an initial value of 1: $\{T1, T2, \ldots, Tn\}$ represents the cumulative rendering duration of GPU1, GPU2, . . . , GPUn, with an initial value of 0); n is the number of target devices; N is the total number of times of rendering, which is configured to measure the performance of rendering by GPU for N times; (2) acquire the rendering durations of the GPUs this time; (3) $\{T1, T2, \ldots . Tn\}$ represents the cumulative rendering durations of the GPUs: variables $\{T1, T2, \ldots, Tn\}$ records rendering durations of corresponding GPUs; (4) calculate N/T1: N/T2: . . . : N/Tn, and take the result as a pixel division ratio: calculate a comparison value N/T1: N/T2: . . . : N/Tn to obtain the FPS of each GPU as a performance index, and take this comparison value as the latest pixel division ratio. The major reason for the delay caused by the traditional multi-GPU scheme based on scissor frame rendering in the rendering process is that a complete image is synthesized after all GPUs complete rendering, resulting in waiting time between GPUs. For a heterogeneous GPU system, multiple GPUS may be different in performance. If the pixel segmentation scheme of equally dividing an image is still adopted, the rendering speed of high-performance GPUs may be faster than that of low-performance GPUs, and the high-performance GPUs may have to wait for the low-performance GPUs to complete tasks, which may lead to a large GPU waiting delay and lower the rendering performance of the whole system. Therefore, by dynamically adjusting a pixel segmentation ratio, high-performance GPUs can share a part of pixel data of low-performance GPUs, which helps to reduce the burden of the low-performance GPUs to achieve the purpose of load balancing, average the rendering durations of the GPUs, and reduce the difference between rendering durations, thereby reducing the overall rendering duration of the system. In addition, the method may also be applicable to various isomorphic and heterogeneous multi-GPU systems.

At S140, the second images are rendered based on rendering tasks in the target devices to obtain second image results, and the second image results are combined to obtain a rendering image of the target image, where the rendering tasks are configured to render the second images.

In an embodiment, the second images are rendered according to rendering tasks in the target devices to obtain second image results, each target device process a corresponding second image, after the target image is divided to obtain second images, the target devices receive task instructions to execute corresponding rendering tasks, the second images are rendered to obtain second image results, and then the second image results are combined to obtain a rendering image of the target image. The rendering tasks are allocated to corresponding target devices, the target devices execute calculation tasks in the rendering tasks in parallel to obtain second image results, and the second image results are combined to obtain a rendering image of the target image, so that the rendering duration is reduced through parallel execution.

Furthermore, the rendering task includes at least one subtask, for example, includes calculation tasks for calculating color values of second images, a copy task for copying, and a display task for displaying onto a screen. Moreover, there may be a sequential relationship between different types of subtasks. Exemplarily, the copy task can only be started after the calculation tasks are completed, and the display task can only be started after the copy task is completed. Each GPU has a certain number of task queues, and the task queues are configured to execute subtasks. Task queues in the target devices are acquired, where the task queues are configured to execute the rendering tasks; subtasks of the rendering tasks are allocated to the task queues; the task queues corresponding to the subtasks of the same type are acquired for parallel execution to obtain second image results; and the second image results are combined to obtain a rendering image of the target image.

Furthermore, the second images are equally divided based on the number of task queues configured to execute the calculation tasks in the task queues, thereby guaranteeing the parallel execution of the task queues of the calculation tasks in the target devices. Exemplarily, by comparing the first rendering durations, it is concluded that when the number of GPUs is four, the rendering duration is the minimum. In order to improve the resource utilization rate of a single GPU, the target image is dynamically segmented to obtain fine-grained data of the second images, and the second images are handed over to different target devices for parallel rendering. In an embodiment, the target image is divided into four second images according to the segmentation ratio, each image is allocated to one target device to perform the rendering task, each of these target devices includes four task queues, and the subtasks of the rendering tasks are allocated to different task queues, where the calculation tasks are allocated to the task queue 1 and task queue 2 to calculate the color values of pixels in the regions, the copy task is allocated to the task queue 3, and the display task is allocated to the task queue 4. It should be noted that there may or may not be a sequential relationship between different tasks. Rendering tasks include a rendering order. However, when subtasks allocated to different task queues are of the same type, the subtasks may be executed in parallel. For example, if the calculation tasks are allocated to the task queue 1 and task queue 2 to calculate the color values of pixels in the regions, then task queue 1 and task queue 2 may execute the tasks in parallel, while if the copy task is allocated to the task queue 3, according to the rendering order, in the same frame, the copy task is executed after the calculation tasks, then the task queue 3 needs to execute the copy task after the calculation tasks are completed. Because the subtasks are submitted to different task queues, the subtasks may be asynchronously executed in parallel. For example, in a first frame, the target image is divided into four second images and the four second images are allocated to four corresponding target devices, where a target device A includes four task queues, and the target device A executes a rendering task on one of the second images, where the task queue 1 and the task queue 2 execute the calculation tasks, the task queue 3 executes the copy tasks, and the task queue 4 executes the display task. After the task queue 1 and the task queue 2 complete parallel execution, the task queue 3 starts to execute the copy task on the first frame of target image, and at this time, because having already completed the tasks, the task queue 1 and the task queue 2 may continue to execute the calculation tasks on the second frame of target image simultaneously, so the rendering speed can be significantly improved through asynchronous parallel execution.

Furthermore, in addition to the calculation tasks, other subtasks may be executed in parallel. Exemplarily, the target device A includes seven task queues, where the task queues 1 to 4 execute the calculation tasks, the task queues 5 and 6 execute the copy task, and the task queue 7 execute the display task. When the target device executes a rendering task, the task queues 5 and 6 are respectively responsible for copying the data of the task queues configured to execute the two calculation tasks. Thus, the real-time rendering speed is accelerated.

Therefore, when it is determined that the subtasks are of the same type, corresponding task queues may be executed in parallel. However, it should be noted that after acquiring the task queues corresponding to the calculation tasks, the second image is divided based on the number of the task queues corresponding to the calculation tasks, thereby guaranteeing the parallel execution of the task queues configured to execute the calculation tasks. Because the calculation tasks are configured to calculate the color values of pixels in the regions, and the processed objects are images, it is required to divide the second images to determine regions to be processed by all the task queues configured to execute the calculation tasks. For other subtasks, such as the copy task, it is required to process the data after completing the calculation tasks, so it is not required to divide the second images. Similarly, for example, for the display task, it is required to process the data after completing the copy task. That is to say, furthermore, when it is determined that the subtasks are calculation tasks, the second image is divided based on the number of the task queues corresponding to the calculation tasks to obtain third images, and color values of pixels of the third images are calculated using the calculation tasks to obtain third images results, and the third image results are combined to obtain the second image results corresponding to the target devices. After the task queues complete the subtasks, the second image results are obtained, and the second image results are combined to obtain a rendering image of the target image. The traditional rendering scheme for images is to execute rendering tasks in series. Exemplarily, the target device A includes seven task queues, where the task queues 1 to 4 execute the calculation tasks, the task queues 5 and 6 execute the copy task, and the task queue 7 executes the display task. It is required to wait for the task queue 1 to complete execution before task queue 2 to execute task, and wait for the task queue 2 to complete execution before the task queue 3 starts to execute task . . . one by one until the images are rendered. Undoubtedly, compared with asynchronous parallel execution, the traditional method has the disadvantages of more time consumed, and slower rendering speed.

Embodiments are provided below to facilitate further understanding.

Figure 2:
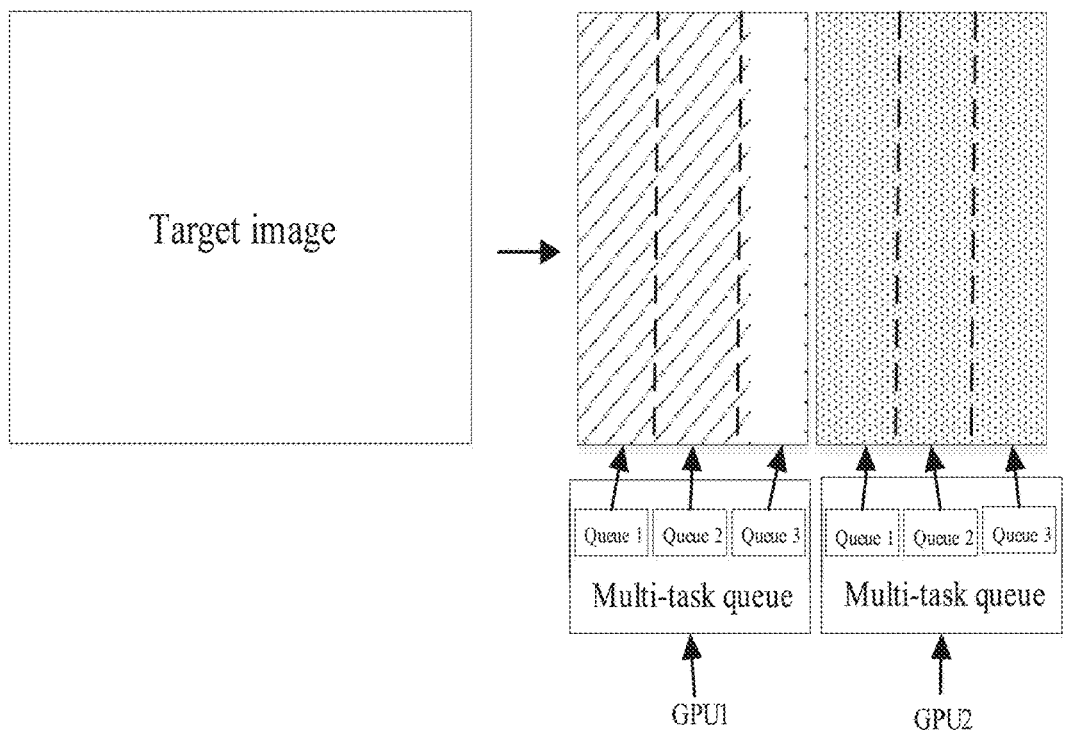
FIG. 2 is a schematic diagram of second image division and task queue division provided by an embodiment of the present disclosure.

Referring to FIG. 2, FIG. 2 is a schematic diagram of second image division and task queue division provided by an embodiment of the present disclosure. Assuming that it is determined that the rendering efficiency is the highest when the number of target devices is two by comparing the first rendering durations, pixel segmentation is performed on a screen region of the target image, the screen space of the target image is equally divided into two parts, a rendering task in the first part is allocated to GPU1, and a rendering task in the second part is allocated to GPU2, thereby guaranteeing that GPU1 and GPU2 may execute the rendering tasks in parallel. After the screen space of the target image is divided, task queues in GPU1 and GPU2 are detected and allocated. In order to clearly show the parallel execution of the task queues, it is required to divide the second images only when the subtasks are calculation tasks. Therefore, in FIG. 2, only task queues corresponding to subtasks configured to execute calculation tasks are shown, and task queues corresponding to other subtasks are omitted. In practice, the task queues are not only configured to execute calculation tasks, but also configured to execute other subtasks. After allocation, the allocation result shows that each of GPU1 and GPU2 includes three task queues for executing calculation tasks, so the pixel regions of the second images corresponding to GPU1 and GPU2 are divided equally again. It should be noted that the number of division is determined according to the number of the calculation tasks in the task queues, and after division, it is guaranteed that multiple queues in GPU1 and GPU2 can also operate in parallel.

Figure 3:
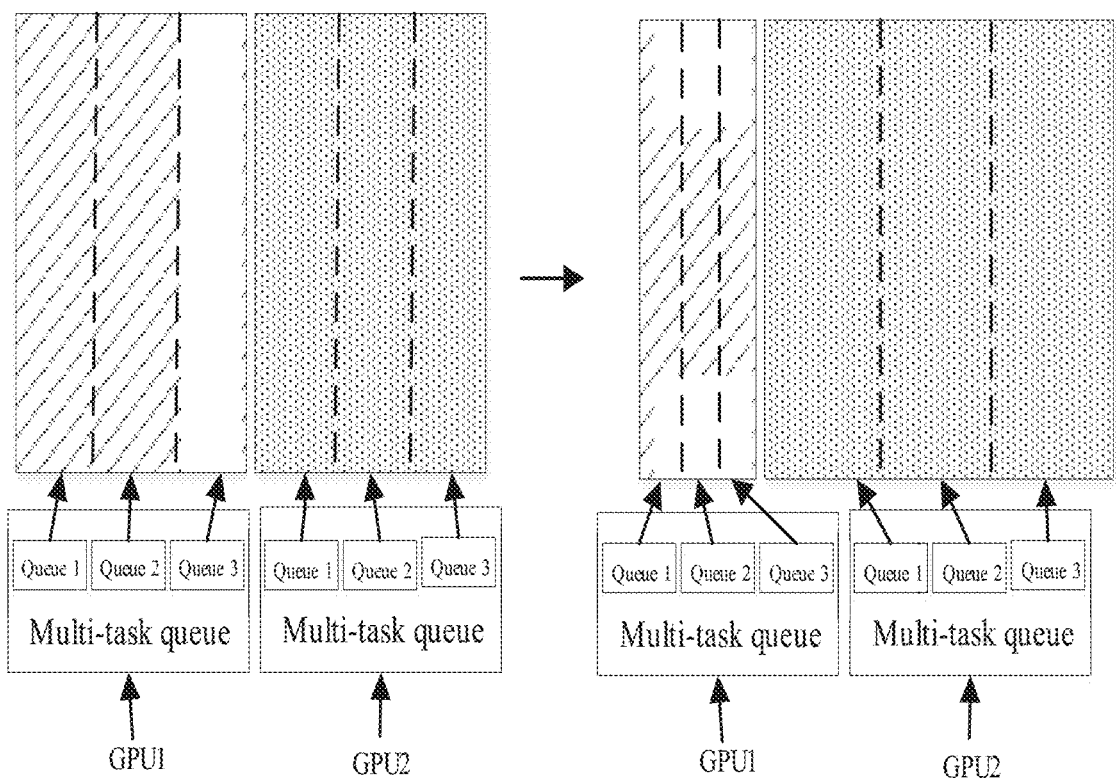
FIG. 3 is a schematic diagram of equal division of second images, and division of second images according to a division ratio provided by an embodiment of the present disclosure.

However, in the actual situation, different target devices have different performances. In view of this, referring to FIG. 3. FIG. 3 is a schematic diagram of equal division of second images, and division of second images according to a division ratio provided by an embodiment of the present disclosure. The left diagram shows a scheme of equal division obtained with reference to FIG. 2, and the right diagram shows a scheme of obtaining a division ratio according to a rendering duration of each target device and then performing dynamic division. By comparing the first rendering durations, it is found that the rendering speed when rendering by two GPUs is the fastest. Furthermore, the performances of GPU1 and GPU2 are repeatedly tested. In order to improve the accuracy, ten rendering tests are conducted respectively, and it is found that the average number of frames of the target image that is rendered by GPU1 in one second is 60, and the average number of frames of the target image that is rendered by GPU2 in one second is 180, that is, the second rendering duration of GPU1 is $1/60$, and the second rendering duration of GPU2 is $1/180$, that is to say, the number of times of rendering of GPU1 multiplied by the second rendering duration of GPU1 is $10/60$, and the number of times of rendering of GPU2 multiplied by the second rendering duration of GPU2 is $10/180$, then the division ratio is $10/60:10/180$, that is. 1:3. According to this division ratio, the target image is divided to obtain second images, so that the pixel ratio of the second images respectively rendered by GPU1 and GPU2 is 1:3, and GPU1 and GPU2 may execute rendering tasks in parallel. Then, task queues in GPU1 and GPU2 are detected, where each of GPU1 and GPU2 includes three task queues configured to execute the calculation tasks.

Therefore, GPU1 and GPU2 equally divide the respective second images according to the number of the task queues, which is convenient for the parallel execution of the task queues configured to execute the calculation tasks. It should be noted that in FIG. 3, only the task queues configured to execute the calculation tasks are shown, and the task queues configured to execute other subtasks are omitted. Therefore, by enabling the GPU with better performance process more pixel data of the second images, the calculation pressure of the GPU with lower performance is greatly relieved. Meanwhile, for a pixel region allocated to each of the GPUs, the average pixel segmentation scheme is still adopted in the GPU, and multiple task queues are adopted to calculate each part of pixels in parallel.

Figure 4:
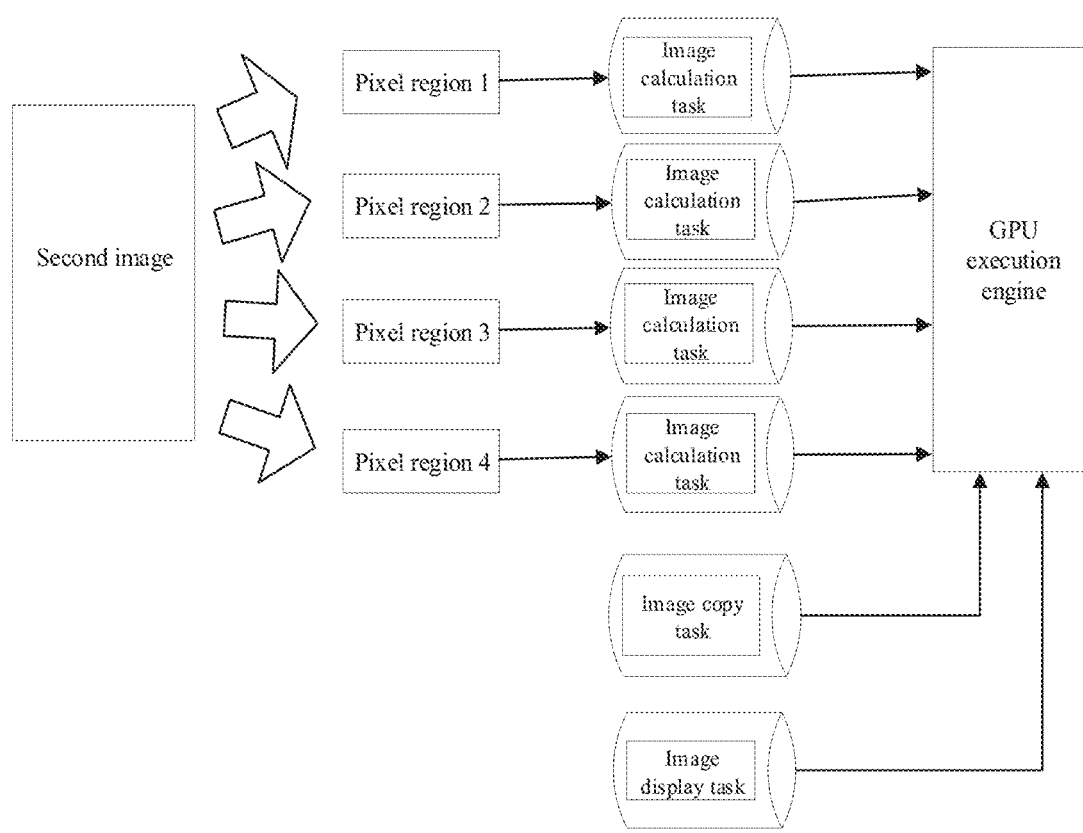
FIG. 4 is a schematic structural diagram of multi-task queue execution provided by an embodiment of the present disclosure.

An embodiment of the execution of the task queues in the target device is provided as follows. Referring to FIG. 4, FIG. 4 is a schematic structural diagram of multi-task queue execution provided by an embodiment of the present disclosure. The second image is divided according to the number of the task queues corresponding to the calculation tasks. In this embodiment, the target device includes four task queues configured to execute the calculation tasks. Thus, the second image is divided into four pixel regions corresponding to the third images, including a pixel region 1, a pixel region 2, a pixel region 3 and a pixel region 4, and the calculation tasks are executed on the four pixel regions by means of the task queues. Meanwhile, the target device further includes other task queues configured to execute an image copy task and an image display task, and after the subtasks in the rendering task are completed, results are transmitted to a GPU execution engine. The task queues configured to execute the calculation tasks may be executed in parallel.

Figure 5:
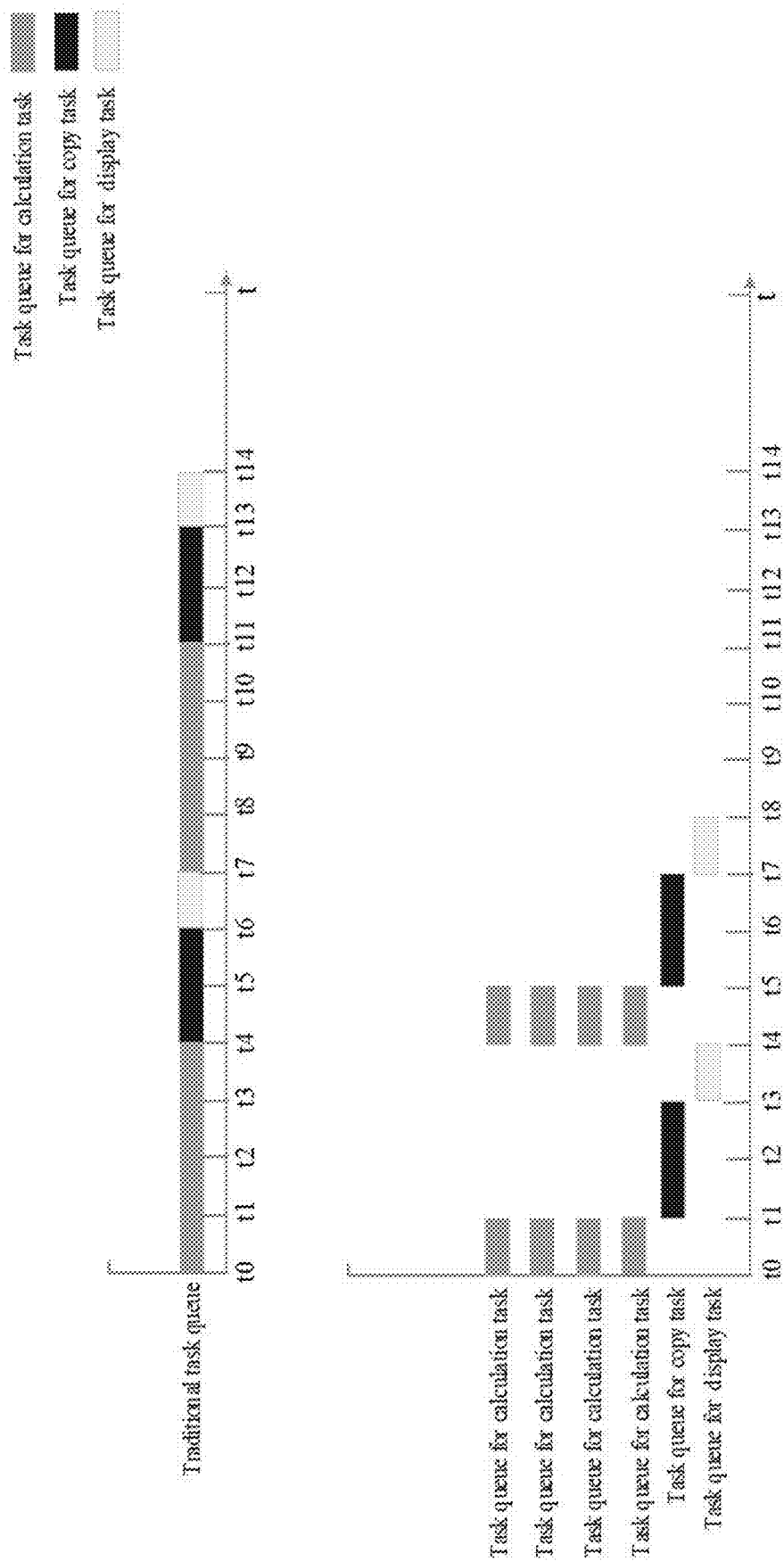
FIG. 5 illustrates a comparison between a schematic diagram of traditional execution of task queues and a schematic diagram of parallel execution of task queues provided by an embodiment of the present disclosure.
Figure 6:
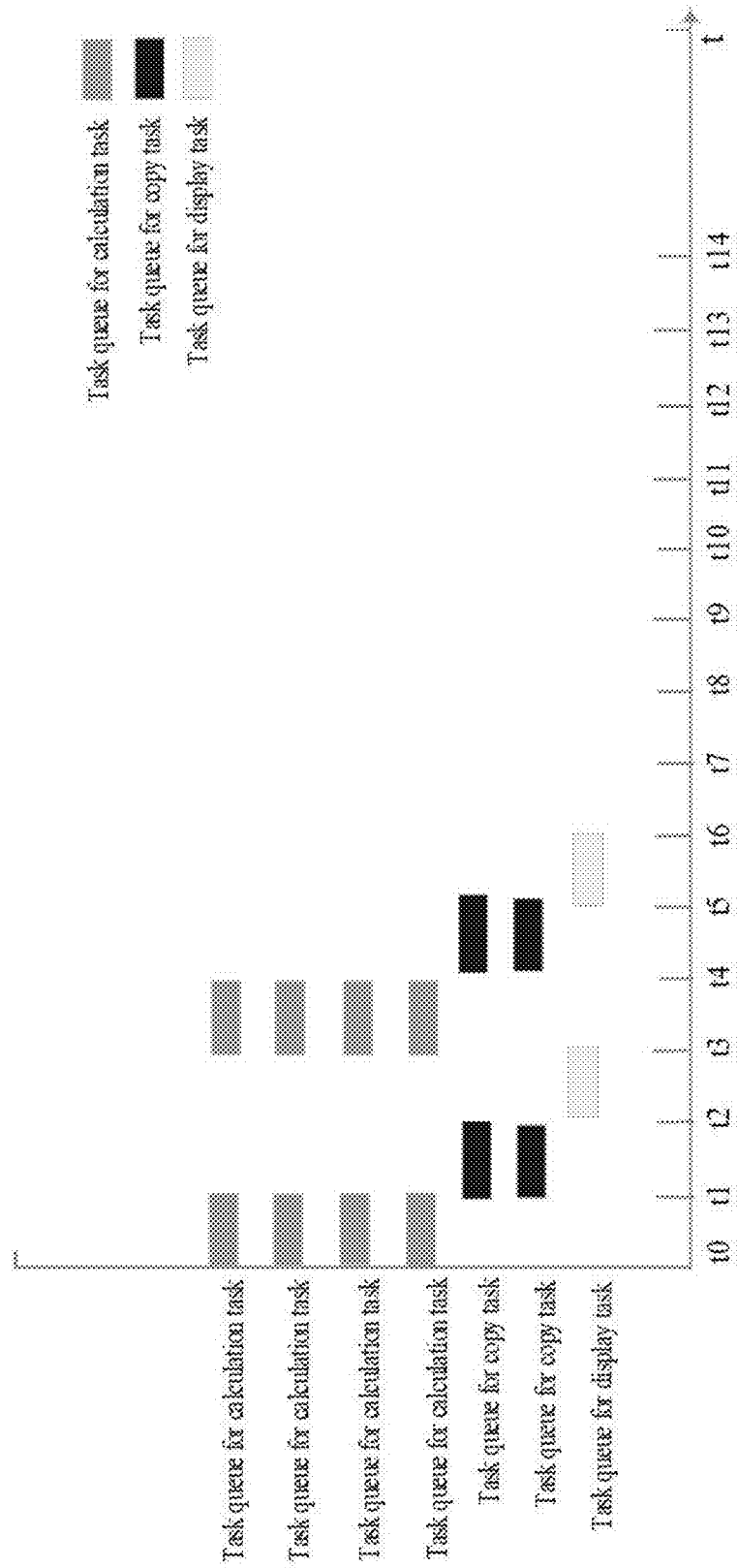
FIG. 6 is another schematic diagram of parallel execution of task queues provided by an embodiment of the present disclosure.

An embodiment of a parallel execution method is provided as follows. Referring to FIG. 5, FIG. 5 shows a comparison between a schematic diagram of traditional execution of task queues and a schematic diagram of parallel execution of task queues provided by an embodiment of the present disclosure. In the embodiment, the rendering task of a certain target device includes four calculation tasks, two copy tasks and one display task. Referring to the upper diagram in FIG. 5, according to the traditional execution method of task queues, in the first frame of image, the four calculation tasks are executed one by one, then the two copy tasks are executed one by one, and then the display task is executed. It takes t7 periods of time to render the first frame of image, the rendering of the second frame of image only begins after completing the rendering of the first frame of image, and it takes t14 periods of time to render the two frames of images in total. For the parallel execution of the task queues, referring to the lower diagram in FIG. 5, the four calculation tasks are executed in parallel by means of the task queues corresponding to the calculation tasks, and then the two copy tasks and the one display task are executed. It takes t4 periods of time to render the first frame of image, and it takes t8 periods of time to render two frames of images in total. Furthermore, for the parallel execution of the queues, in the process of executing the copy tasks, the task queues corresponding to the calculation tasks have completed work and are in an idle state, in this case, the calculation tasks in the second frame of image may be performed. It takes less than t8 periods of time to process two frames in this case. The rendering speed is significantly improved. Furthermore, FIG. 6 is another schematic diagram of parallel execution of task queues provided by an embodiment of the present disclosure. In addition to executing the calculation tasks in parallel, other subtasks may be executed in parallel. In an embodiment, the rendering task of a certain target device includes four calculation tasks, two copy tasks and one display task. After the calculation tasks are executed in parallel by means of the task queues corresponding to the calculation tasks, because there are two task queues corresponding to the copy tasks, the task queue corresponding to one copy task processes the data output by the task queues corresponding to two calculation tasks. Therefore, it only takes t3 periods of time to render the first frame of image, and it only takes t6 periods of time to render two frames of images, further improving the rendering speed and reducing the rendering duration.

Furthermore, displaying the rendering image of the target image onto the screen includes, but is not limited to, the following modes:

acquiring one of the target devices as a display device, and displaying a rendering image of the target image by receiving the rendering image of the target image by means of the display device and interacting with a screen: or displaying the second image results by interacting with the screen by means of the target devices. In an embodiment, after acquiring one of the GPUs and combining the second image results, the combined second image result is displayed onto the screen by means of this GPU. This mode is only limited to a single screen. Alternatively, the rendered second image results are directly displayed onto the screen by means of the target devices for rendering, what is displayed onto the screen is the rendering image of the target image completed. This mode may implement multi-GPU split-screen rendering.

Figure 7:
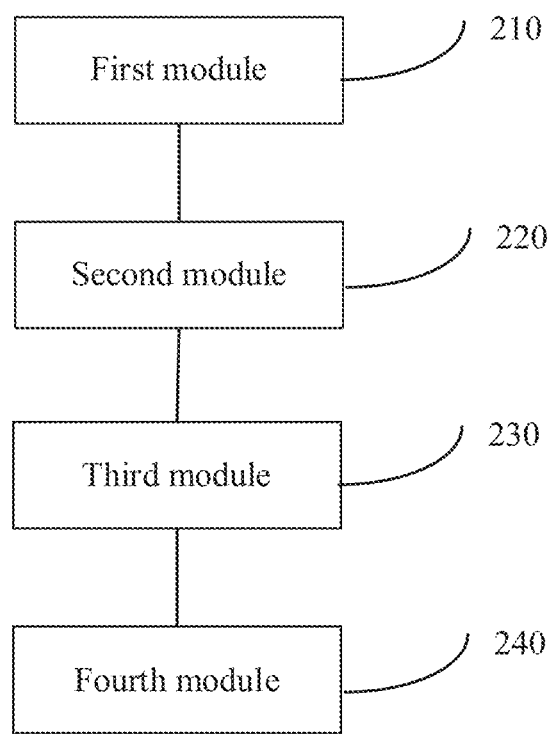
FIG. 7 is a schematic diagram of a multi-GPU-based image rendering apparatus provided by an embodiment of the present disclosure.

Referring to FIG. 7, FIG. 7 is a schematic diagram of a multi-GPU-based image rendering apparatus provided by an embodiment of the present disclosure, the apparatus includes a first module 210, a second module 220, a third module 230 and a fourth module 240.

The first module 210 is configured to acquire a target image, and detect first rendering durations for different number of available devices to render the target image, where the available devices are GPU devices for image rendering.

The second module 220 is configured to compare the first rendering durations corresponding to different number of available devices, and acquire the available devices corresponding to a minimum one of the first rendering durations as target devices.

The third module 230 is configured to divide the target image according to the target devices and a second rendering duration to obtain second images, where the second rendering duration is a duration required for a single target device to render the target image.

The fourth module 240 is configured to render the second images based on rendering tasks in the target devices to obtain second image results, and combine the second image results to obtain a rendering image of the target image, where the rendering tasks are configured to render the second images.

An embodiment of the present disclosure further discloses a computer program product or computer program, the computer program product or computer program including computer instructions which are stored in a computer-readable storage medium. A processor of a computer device may read the computer instructions from the computer-readable storage medium, and the processor executes the computer instructions, so that the computer device performs the method shown in FIG. 1.

In some alternative embodiments, the functions/operations mentioned in the block diagram may occur out of the order mentioned in the operation diagram. For example, two blocks shown in succession may in fact be executed substantially concurrently or may sometimes be executed in the reverse order, depending on the functions/operations involved. In addition, the embodiments presented and described in the flowchart of the present disclosure are provided by way of example, so as to provide a more comprehensive understanding of the technology. The disclosed method is not limited to the operations and logic flows presented herein. Alternative embodiments are contemplated in which the order of various operations may be changed and in which sub-operations described as part of a larger operation may be performed independently.

Furthermore, although the present disclosure is described in the context of functional modules, it should be understood that, unless otherwise specified, one or more of the functions and/or features described may be integrated in a single physical apparatus and/or software module, or one or more functions and/or features may be implemented in a separate physical apparatus or software module. It can also be understood that a detailed discussion about the actual implementation of each module is not necessary for understanding the present disclosure. More precisely, considering the attributes, functions and internal relations of various functional modules in the apparatus disclosed herein, the actual implementation of the modules will be known within the conventional technology for engineers. Therefore, those having ordinary skills in the art can implement the present disclosure set forth in the claims without undue experimentation by using the ordinary technology. It can also be understood that the specific concepts disclosed are merely illustrative and are not intended to limit the scope of the present disclosure, which is determined by the entire scope of the appended claims and their equivalent schemes.

If the functions are implemented in the form of software function units and sold or used as independent products, they may be stored in a computer-readable storage medium. Based on such understanding, the technical scheme of the embodiment of the present disclosure essentially, or the part that contributes to the existing technology or part of the technical scheme may be embodied in a form of a software product. The computer software product is stored in a storage medium, and includes a plurality of instructions for enabling a computer device (which may be a personal computer, a server, a network device or the like) to perform all or some of the steps of the method described in the embodiments of the present disclosure. The aforementioned storage medium includes: a USB flash disk, a mobile hard disk, a Read-Only Memory (ROM), a Random Access Memory (RAM), a magnetic disk, an optical disk or other media that can store program codes.

The logic and/or steps represented in the flowchart or described in other ways herein, for example, may be regarded as a sequenced list of executable instructions for implementing logical functions, and may be implemented in any computer-readable medium for use by or in conjunction with an instruction execution system, an apparatus or a device (such as a computer-based system, a system including a processor or other systems that can read instructions from the instruction execution system, the apparatus or the device and execute the instructions). For the purpose of this description, a "computer-readable medium" may be any apparatus that can include, store, communicate, propagate, or transmit a program for use by or in conjunction with the instruction execution system, the apparatus or the device.

More examples of the computer-readable medium (non-exhaustive list) include the following: an electrical connection component (electronic device) with one or more wires, a portable computer disk cartridge (magnetic apparatus), a Random Access Memory (RAM), a Read-Only Memory (ROM), an Erasable Programmable Read-Only Memory (EPROM or flash memory), an optical fiber apparatus, and a portable Compact Disk Read-Only Memory (CDROM). In addition, the computer-readable medium may even be paper or other suitable medium on which the program can be printed, because the program may be obtained electronically by, for example, optically scanning the paper or other medium, followed by editing, interpreting or processing in other suitable ways if necessary, and then stored in a computer memory.

It should be understood that various parts of the present disclosure may be implemented by hardware, software, firmware or a combination thereof. In the above implementation, a plurality of steps or methods may be implemented by software or firmware stored in a memory and executed by an appropriate instruction execution system. For example, if implemented by hardware, as in another implementation, a plurality of steps or methods may be implemented by any one of the following technologies known in the art or a combination thereof: a discrete logic circuit with a logic gate circuit for implementing a logic function on a data signal, an application-specific integrated circuit with a suitable combinational logic gate, a Programmable Gate Array (PGA), a Field Programmable Gate Array (FPGA), and the like.

In the description, the terms "an embodiment". "some embodiments", "example", "specific example" or "some examples" means that the specific features, structures, materials or characteristics described in conjunction with the embodiment or example is included in at least one embodiment or example of the present disclosure. In this description, the schematic expressions of the above terms do not necessarily refer to the same embodiment or example. Moreover, the specific features, structures, materials or characteristics described may be combined in any one or more embodiments or examples in a suitable manner.

Although the embodiments of the present disclosure have been shown and described, those having ordinary skills in the art can understand that various changes, modifications, substitutions and variations may be made to these embodiments without departing from the principle and protection scope of the present disclosure. The scope of the present disclosure shall be defined by the claims and their equivalents.

The above is a detailed description of the preferred embodiments of the present disclosure, but the present disclosure is not limited to the above embodiments. Those having ordinary skills in the art may also make various equivalent modifications or substitutions without violating the protection scope of the present disclosure, and these equivalent modifications or substitutions shall fall within the scope defined by the claims of the present application.

What is claimed is:

1. A multi-GPU-based image rendering method, comprising:

acquiring a target image, and detecting first rendering durations for different number of available devices to render the target image, wherein the available devices are GPU devices for image rendering;

comparing the first rendering durations corresponding to different number of available devices, and acquiring the available devices corresponding to a minimum one of the first rendering durations as target devices, which specifically comprises:

adjusting the number of the available devices, and equally dividing the target image based on the number of the available devices to obtain first images;

allocating the first images to the available devices, and acquiring durations for the available devices to render the first images as first rendering durations; and comparing the first rendering durations required by different number of available devices, acquiring the number of available devices corresponding to a minimum one of the first rendering durations as a first value, and selecting the available devices with the number being the first value as the target devices;

dividing the target image according to the target devices and a second rendering duration to obtain second images, wherein the second rendering duration is a duration required for a single target device to render the target image, which specifically comprises:

acquiring a duration required for a single target device to render the target image as a second rendering duration;

acquiring the number of frames of the target image that is rendered by the single target device in a fixed time to obtain the second rendering duration;

comparing reciprocals of second rendering durations of different target devices to obtain a division ratio; and dividing the target image based on the division ratio to obtain second images; and rendering the second images based on rendering tasks in the target devices to obtain second image results, and combining the second image results to obtain a rendering image of the target image, wherein the rendering tasks are configured to render the second images.

2. The multi-GPU-based image rendering method of claim 1, wherein rendering the second images based on rendering tasks in the target devices to obtain second image results, and combining the second image results to obtain a rendering image of the target image comprises:

allocating rendering tasks to the target devices;

executing, by the target devices, the rendering tasks in parallel to obtain second image results; and combining the second image results to obtain a rendering image of the target image.

3. The multi-GPU-based image rendering method of claim 2, wherein rendering the second images based on rendering tasks in the target devices to obtain second image results, and combining the second image results to obtain a rendering image of the target image comprises:

acquiring task queues in the target devices, wherein the task queues are configured to execute the rendering tasks;

allocating subtasks of the rendering tasks to the task queues;

acquiring the task queues corresponding to the subtasks of the same type for parallel execution to obtain second image results; and combining the second image results to obtain a rendering image of the target image.

4. The multi-GPU-based image rendering method of claim 1, wherein rendering the second images based on rendering tasks in the target devices to obtain second image results, and combining the second image results to obtain a rendering image of the target image comprises at least one of:

acquiring one of the target devices as a display device, and displaying a rendering image of the target image by receiving the rendering image of the target image by means of the display device and interacting with a screen; or displaying the second image results by interacting with the screen by means of the target devices.

5. An electronic device, comprising a processor and a memory, wherein:

the memory is configured to store a program, and the processor is configured to execute the program to perform the method of claim 1.

6. A non-transitory computer-readable storage medium, storing a program which, when executed by a processor, causes the processor to perform the method of claim 1.

* * * * *